United States Patent [19]

Burns et al.

[11] Patent Number: 4,936,937
[45] Date of Patent: Jun. 26, 1990

[54] PROCESS FOR MAKING A HIGHLY PLASTICIZED VINYL FABRIC

[75] Inventors: Alan W. Burns, Oaklyn, N.J.; Robert D. Scarth; John V. Mascaro, both of Philadelphia; J. W. Hegenboden, Conshohocken; Moses Green, Jr., Philadelphia, all of Pa.

[73] Assignee: Pioneer-Leimel Fabrics, Inc., Philadelphia, Pa.

[21] Appl. No.: 224,484

[22] Filed: Jul. 26, 1988

Related U.S. Application Data

[62] Division of Ser. No. 719,756, Apr. 4, 1985, Pat. No. 4,764,412.

[51] Int. Cl.⁵ .............................................. B29C 47/02
[52] U.S. Cl. ........................... 156/244.11; 156/244.23; 156/244.24; 428/253; 428/254; 428/904
[58] Field of Search ..................... 156/244.11, 244.23, 156/244.24; 428/156, 171, 172, 253, 254, 904

[56] References Cited

U.S. PATENT DOCUMENTS

| | | | |
|---|---|---|---|
| 2,714,571 | 8/1955 | Irion et al. | 156/244.24 |
| 2,722,495 | 11/1955 | Hedges | 428/253 |
| 2,739,919 | 3/1956 | Artzt | 428/253 |
| 3,127,306 | 3/1964 | Turton et al. | 428/253 |
| 3,366,528 | 1/1968 | Takehawa | 428/253 |
| 3,377,199 | 4/1968 | Altan | 428/253 |
| 3,440,133 | 4/1969 | Burnett | 438/253 |
| 3,514,365 | 5/1970 | Burnett et al. | 428/253 |
| 3,723,234 | 3/1973 | MacDonald | 428/253 |
| 4,284,681 | 8/1981 | Tidmarsh et al. | 428/253 |
| 4,465,730 | 8/1984 | Okada | 428/904 |
| 4,556,589 | 12/1985 | Newmann et al. | 428/253 |

Primary Examiner—Caleb Weston
Attorney, Agent, or Firm—Louis Weinstein

[57] ABSTRACT

A laminated vinyl fabric and a process for making the same, said fabric comprising a sheet of vinyl resin with which a major proportion of plasticizer is combined, said fabric also having been made by extrusion and promptly thereafter having been adhesively laminated at a relatively low temperature with a knitted fabric at substantially only wrap pressure. In one form, the knitted fabric is of an interlock double-knit construction with one surface thereof having a relatively small number of contacts with said vinyl sheet via an intermediate adhesive.

20 Claims, 3 Drawing Sheets

LEGEND

• = NEEDLES (DIAL AND CYLINDER)

ℓ = DIAL KNITTED STITCH

ʊ = CYLINDER KNITTED STITCH

D = ODD DIAL NEEDLE

D' = EVEN DIAL NEEDLE

C = EVEN CYLINDER NEEDLE

C' = ODD CYLINDER NEEDLE

TWO ROWS OF DOTS EQUALS ONE KNITTING FEED.

FABRIC CONSTRUCTION CYCLE COMPLETES ON SIX (6) FEEDS.

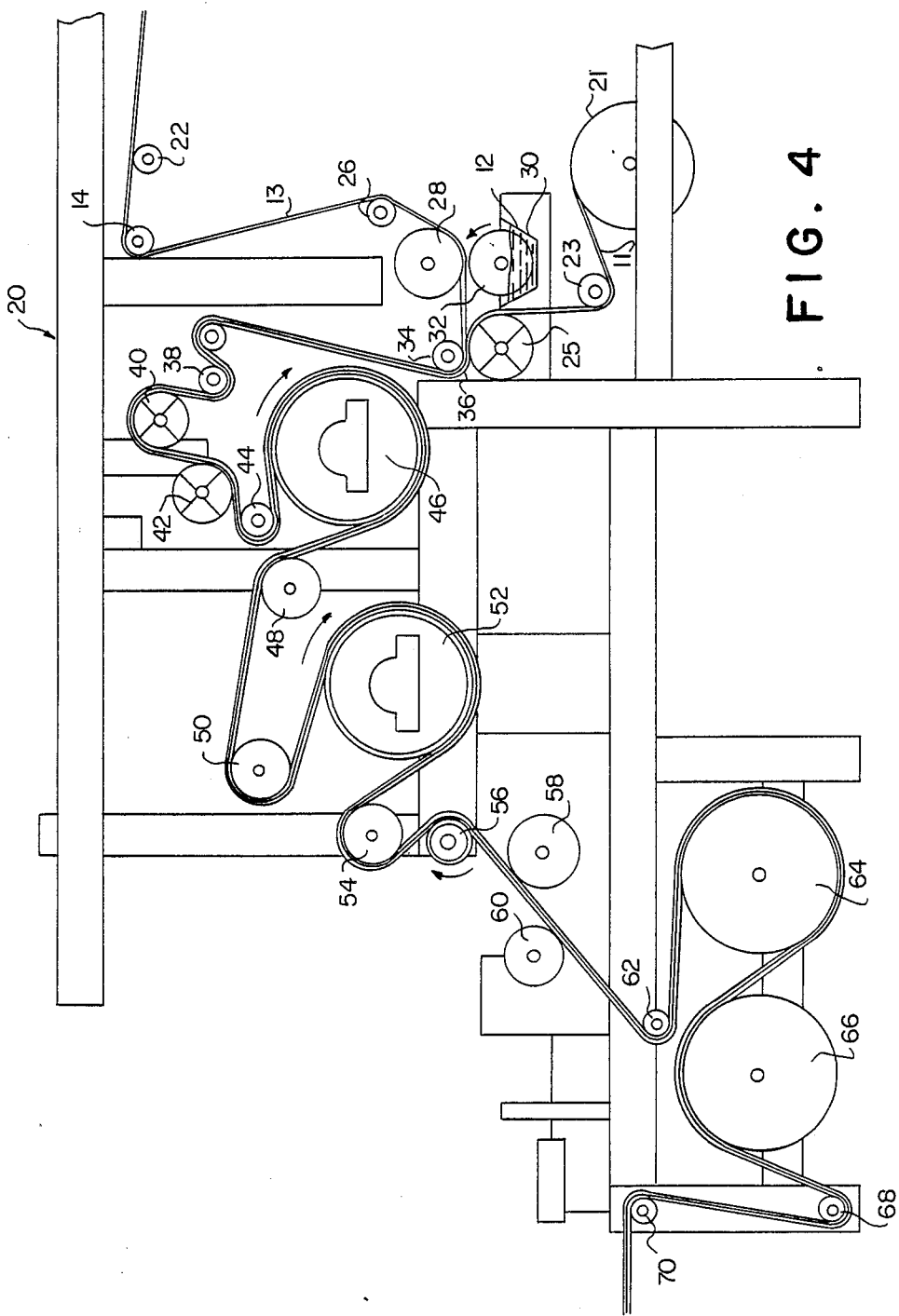

PROCESS FOR MAKING A HIGHLY PLASTICIZED VINYL FABRIC

This is a division, of application Ser. No. 719,756, filed Apr. 4, 1985, now U.S. Pat. No. 4,764,412.

BACKGROUND OF THE INVENTION

1. Field of the Invention

This invention relates to a vinyl fabric and method for its manufacture and lamination. In particular, the fabric is intended for upholstery purposes and related uses.

2. Prior Art

The use of plastic and laminated plastic fabrics is a well developed art, especially fabrics for upholstering seats, benches, both for domestic and commercial use as well as in cars. Various types of plastic material have been proposed or used for these purposes including polyurethane and vinyl-derived or related plastics. Polyurethane has the disadvantage of being relatively expensive, but does have some advantages in terms of its being able to be used in thinner films. Being thin, it has a certain compliance with the shape of the body that enables it to be used for garments without being unduly tearable due to its high tensile strength. Those same characteristics also enable it to be used for handbags, for example. When it comes to possible applications for upholstering, however, its cost makes it non-competitive for many applications. Besides, when so used, ambient moisture can break down the urethane component and render it powdery. This tends to reduce its overall strength.

Vinyl, on the other hand, is less expensive than polyurethane and has been extensively used for upholstery purposes. It has certain disadvantages when so used, especially when used with buttons for the upholstery, because the continual flexing of the fabrics upon impact with the human body sometimes allows the button to fall out and the stitching holding it in place to tear along the stitch lines. Usually, vinyl is used with a backing of some kind so as to prevent some of these problems. Expanded vinyl, i.e., vinyl with cells formed therein by conventional "blowing" agents, is sometimes used for upholstery applications, but it has the disadvantage that folding of the expanded vinyl or flexing at the same place will ultimately cause the cells to break down. As a result, the fold line or the flex line retains the creases for far too long.

In addition, vinyl must be so made that when used for upholstery covering material, it will resist the constant rubbing of its surface by the human body in use which will abrade its surface as, for example, when people slip into or out of a booth containing vinyl-covered seats or benches.

Nonetheless, vinyl is still one of the principal ingredients of fabrics intended for upholstery covering.

In the past, vinyl-based fabrics have been available, but they have not had as leather-like a "hand", i.e., the desired texture, suppleness, and drape that real leather possesses. Sometimes this is the case because the composite, laminated fabric has the backing layer pressed relatively deeply into the surface of the vinyl to which it is adhered either by heat and pressure or by the use of an intermediate adhesive under the desired pressure conditions during lamination. When non-woven fabrics are used, their very construction tends to reduce the resilience, compliance or suppleness of the composite laminated material. Another reason for the deficient hand or suppleness is the vinyl composition used. The elasticity of plastics such as vinyl is adjustable by the use of plasticizers, but it has usually been the case that vinyl sheets or webs made either by extrusion or calendering processes are limited in the proportion of plasticizer relative to the resin that may be employed without impairing the characteristics of the vinyl sheet.

The suppleness of a vinyl fabric is, in large measure, a function of the amount of plasticizer used. While ratios of 3:2 of resin to plasticizer have been known, lower ratios approaching equality are not known to be used in extrusion or calendering methods of forming unsupported vinyl sheet. With plastisol methods of forming vinyl sheeting, lower ratios approaching equality are known, but the types of resin and release paper carrier sheet used in making the fabric are considerably more expensive.

It is therefore among the objects of the present invention to provide:

1. A highly supple vinyl sheet material having a pleasing hand.
2. A vinyl-laminated material having excellent suppleness, hand and drape characteristics.
3. An unexpanded vinyl sheet possessing excellent hand.
4. A vinyl laminate highly suitable for upholstery purposes.
5. A method of making the vinyl sheet material mentioned above and laminating it to desired substrates for upholstery and kindred purposes.
6. A strong but supple, stretchable, upholstery fabric that does not suffer from the effects of hydrolytic exposure.
7. A vinyl sheet material and laminates thereof which possess excellent crease resistance.
8. A vinyl sheet material and laminates thereof for upholstery and related uses that is relatively inexpensive and has many of the desirable features of real leather.

SUMMARY OF THE INVENTION

A vinyl sheet is made from a mixture comprising substantially major proportions of vinyl resin and plasticizers and then extruded into a sheet or web. The web is laminated to a knitted backing fabric at a temperature such that the integrity of the surface of the vinyl sheet is not impaired.

BRIEF DESCRIPTION OF THE DRAWINGS

FIG. 4 is a schematic diagram of the process and apparatus used in laminating the vinyl sheet to the knit backing material.

DESCRIPTION OF THE MANUFACTURING PROCESS-VINYL PREPARATION

Figure 2:
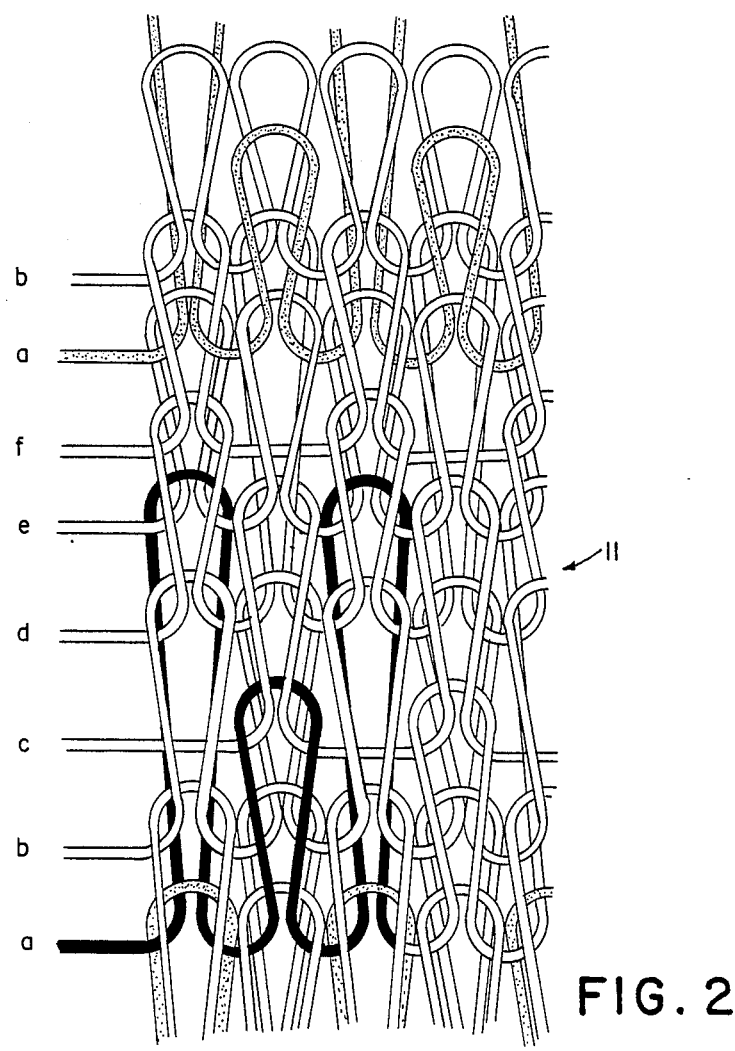
FIG. 2 is a loop diagram showing the stitch construction of the knitted backing fabric used in one embodiment of the present invention.

In order to achieve the desired leather-like "hand" and drape as well as the other objects of the invention stated previously, we have found that the process to be described below has resulted in an extremely satisfactory laminated vinyl fabric.

The first step is to compound a flowable, dry powder blend to be applied to an extruding machine. For this purpose, there is first prepared a mixture of polyvinyl chloride resin, with ground limestone. The resin may be FPC 9339 manufactured by Occidental Petroleum and/or Epivyl 43 distributed by Israel Electrochemical Industries of Haifa, Israel. Preferably, there are 50 parts of the FPC 9339 and 110 parts (by weight) of the Epivyl 43 although the former may be present in the range 0–160 parts by weight and the latter 160–0 parts by weight. The ground limestone may be present in the range 0–75 parts by weight although 50 parts by weight was used to obtain extremely good results. A commercially available limestone is "Verplus" distributed by the White Pigment Corporation of Florence, Vt. Alternatively, calcium carbonate could be used for the same filler purposes.

The resin and the limestone are put into a Welex 500 mixer having two speeds of operation at 1700 and 3400 rpms respectively. Its capacity is 500 liters and the two powders are mixed at 1700 rpm. After both are added, the speed is increased to 3400 rpm and the temperature of the powders rises to 120° F. At this time, a plasticizer such as a plasticizer oil is added gradually which is absorbed by the powders on their surfaces. The plasticizer oils can be 155–55 parts by weight of DOP/EPO 93/7, a mixture comprising di-2-ethel-hexyl phthalate and epoxidized soya oil which has a relatively low molecular weight and good solvating action. We have found that using the mixture together with a polyester such as NUOPLAZ 6187 in 0–100 parts by weight has produced superior results. The NUOPLAZ has a high molecular weight and may be regarded as a permanent plasticizer inasmuch as it is not as likely to rub off the surface of the vinyl web in use.

Following the addition of the plasticizer oil, color pigment paste such as DOP paste is added in the range of 1–15 parts by weight with 7 parts by weight being found to be advantageous. At the same time, the heat stabilizer and the hydrated silica filler are also added. The heat stabilizer may be Nuostabe 1531 which, like NUOPLAZ 6187 is distributed by Nuodex, Incorporated of Piscataway, N.J. Nuostabe comprises liquid barium, cadmium, and zinc components which prevent premature discoloration of the vinyl composition that is extruded. The hydrated silica may be Zeothix 95 distributed by Huber Corporation and may be present in 0–10 parts by weight with 7 parts being found particularly good. The entire components put into the mixture comprise a single batch of, say, 385 pounds and is processed for 7–8 minutes until it becomes a dry powder having a temperature of about 180°–200° F. This powder is then applied to a ribbon blender-cooler having a 2000 pound capacity. This blender-cooler is a water-jacketed trough with helical mixing blades that cools and blends the hot batches of powder proceeding from the Welex mixer. Four or five batches of the dry powder are mixed in the blender-cooler at a time for about 15 minutes. This blends all of the batches and avoids lumping, and color-matching samples may be taken to insure continuity of the color from one roll of the vinyl to another. The powder, which is now ready for extrusion, is stored in 1000 pound boxes prior to transport to the extruder.

EXTRUSION

In the Example below, the extruding apparatus is designed primarily for powder input. The actual extrusion apparatus was manufactured by Modern Plastic Machinery and comprises a hopper input for gravity feed of the dry blended powder leading to a thick-walled cylindrical barrel which is electrically heated and air cooled and vented. A screw comprising a single helix having a square pitch is mounted for rotation by electrical means within the barrel and is cored for recirculation of temperature-controlled water from a precision temperature controller. It conveys the plastic composition along the barrel so that the composition is transformed by frictional work input and barrel heat into a homogeneous, hot melt and fed into a transition adapter. The latter is a thick-walled pipe, electrically heated, which conducts the hot melt from the barrel to the feed opening of the output die.

The die itself is electrically heated and has a thick-walled clam-shell opening downwardly. Its inner cavity has a clothes-hanger or fan-shaped cross-section, widening gradually downward from the discharge end of the transition adapter to the slot discharge opening of the die. The slot has one fixed lip and the other adjustable by screw pressure for precise thickness control of the plastic extrudate.

In practice, the temperature of the barrel, from the hopper end to the beginning of the transition adapter, is electrically heated in six stages as follows:
1. 300°–310° F.
2. 315°–325° F.
3. 330°–340° F.
4. 345°–355° F.
5. 360°–365° F.
6. 355°–360° F.

The blowers supply ambient air to keep the temperatures of the stages within the prescribed limits. The screw itself, as stated before, is cored for recirculation of water within the prescribed temperature range of about 50° F.

The extrudate is fed to a first set of rollers comprising a water-cooled metallic embossing roller cooperating with a rubber-coated back-up roller which is also internally cooled by water and externally as well, the excess being squeegeed off. The rubber-covered roller is known as the impression roller and its pressure against the textured steel roller is precisely controlled by pneumatically operated pistons.

The rate at which the pair of nip rollers pulls the web from the die slot largely determines the final thickness which, in one illustrative case, is 0.011 inches by 57½ inches. The web proceeds past the initial pair of nip rollers and is then drawn over driven chilled water cooling drums since the web is still warm and might otherwise be pulled too thin by undriven drums. The web is then monitored by a thickness-measuring device and various edge-trimming devices are used to keep the width of the web within prescribed limits. Various control devices are used for monitoring or adjusting the speed of the various driven rollers to compensate for changes in the thickness of the web due to the contraction thereof when it is cooled. Finally, the web is applied to a rewind turret which allows a fully-wound core to be set aside while the next core is prepared for delivery of the web to it.

TOP COATING - LUSTER CONTROL

The next step after formation of the vinyl web is the application of a top coating of a luster control lacquer. This step gives the vinyl web a harder, dryer surface with a better feel, that is to say, a very pliable dry hand similar to leather, as well as a predetermined luster. The top coating is made of a number of ingredients as follows:

1. A polyvinyl chloride resin such as Vygen 85 marketed by General Tire & Rubber. It has a medium molecular weight and is chosen as a compromise between higher molecular weight resins which might have greater abrasion resistance, but less solubility, and lower molecular weight resins which have greater solubility, but less abrasion resistance. This homopolymer is present in the range of 45–55 parts by weight with a preferred figure of 50 parts by weight.
2. Polymethylmethacrylate resin such as Lucite 2010 by DuPont which has a high molecular weight. It is present in the range of 10–15 parts by weight with a preferred number of 13.75 parts by weight.
3. Silicon fluid, a surface lubricant, such as SF96 with a viscosity measure of 100 centistokes. This constituent is marketed by General Electric and imparts dry slip to the finished product.
4. Hydrated Silica such as Zeothix 95 marketed by the Huber Corporation. This is a dulling or anti-luster agent and is present in the range of 14–18 parts by weight with the preferred number being 16.
5. Cyclohexanone Solvent such as the one produced by Union Carbide. It is an oily solvent and is very useful in putting resins into solution. While its solvent properties are good, it is relatively slow to dry and therefore is one of the two solvents that are actually used. It is present in the range of 100–150 parts by weight with the preferred number being 118 parts by weight.
6. Cellulose Acetate Butyrate resin which is added for anti-blocking purposes. One very acceptable such resin is CAB 381 produced by Eastman Chemical and has a viscosity rating of 0.5 seconds. It is present in the range of 1–3 parts by weight with a preferred number of 2 parts by weight.
7. Methyl Ethyl Ketone which is a low boiling point solvent that dries rapidly and is used to offset the high boiling point solvent in Paragraph 5 above. It is added in the range of 300–400 parts by weight, a preferred number being about 370.

To prepare the top coating, the cyclohexanone is first poured into a 55 gallon drum. A Cowles Dissolver comprising a variable speed 10" diameter toothed disc impeller mounted on a vertical shaft is lowered into the drum and the shaft is rotated at 500 RPM. Then the resin powders and the hydrated silica duller are gradually added to the solvent until they are dispersed. Next, the methyl ethyl ketone solvent is added, filling up the drum to the 40 gallon mark and the rate of mixing is increased to 2000 rpm. When the solvent and other contents have been fully dispersed, the silicone fluid is added and mixed. Finally, half of that drum is put into a second empty drum. Then, the viscosity of the contents of both drums is adjusted to 30–50 centipoises, the desired viscosity range for the coating.

TOP-COATING APPARATUS

The next step is to apply the composition derived as explained above to the vinyl web. The lacquer is inserted into feed troughs into which gravure cylinders are partially submerged. These cylinders are parts of printing machines, such as the Liberty-type printing machine line, which include two driven, engraved, chrome-plated, steel print cylinders. The cylinders are pressed under pneumatic pressure against a common rubber-covered steel idler roll. There may be more than one such pair of print cylinder-idler rolls in the machine depending upon the individual machine's design. Any excess lacquer on the cylinders is scraped back into the supply trough by a thin steel doctor blade. The vinyl web is drawn from a supply roll on a rack, over supporting idler rollers, through edge guides (which prevent wrinkles and control the web width), around brake rollers and into the nip of the first driven gravure cylinder in contact with the rubber-covered idler back-up roller. Then the web is fed across a slat expander and, if desired, through a second station of two gravure cylinders rotating within troughs and in contact with a common rubber-covered steel idler roll. From there, the coated web is taken away by the "apron" which is an endless canvas conveyor belt, passing through an air drying tunnel where blowers are provided to evaporate practically all of the remaining solvent. The web is passed into an accumulator, a set of horizontal steel rollers over which the web is passed for two purposes. One is to control the tension on the web. The other is to accumulate yardage of the web while a completely-wound spindle is severed from the web and doffed at the same time as a second empty spindle is attached to the web and begins to be driven.

LAMINATION

Figure 1:
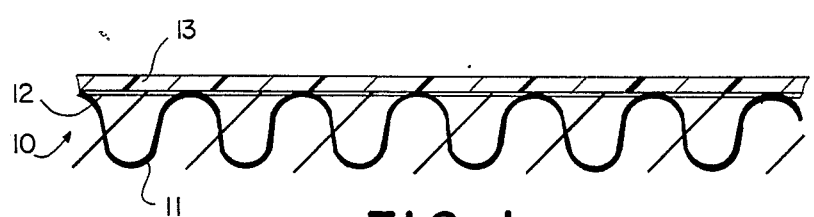
FIG. 1 is a cross-sectional view of a laminated fabric constructed in accordance with the present invention.

The final step is the lamination of the coated vinyl web to a backing to form the composite finished product shown at the numeral 10 in FIG. 1. The composite comprises the coated vinyl web 13 joined by an adhesive layer 12 to a knitted fabric 11. The knitted fabric 11 has a structure as shown in FIG. 2 which will be described in more detail later.

FIG. 4 shows the apparatus used to laminate the vinyl web produced by the preceding steps with the knitted fabric material. The web 13 is passed over idler rollers 14, 22 and 26 and into the nip formed by an adhesive applicator roll 32 and a rubber back-up roller 28. Roller 32 is driven and revolves in a trough 30 of an aqueous adhesive, the level of the adhesive being maintained at a constant level by a pump feed and an overflow return to a supply drum. The roller 32 may have helical grooves cut in it. The web 13 passes between the applicator roll 32 and the idler roller 28 which is pressed against the applicator roll with controlled pressure from pneumatic cylinders not shown. The vinyl web 13 enters the nip with approximately 90° wrap so that the unfinished back of the vinyl 13 is coated uniformly with 2–4 mils of the wet adhesive.

In one preferred embodiment, the aqueous adhesive emulsion WA708, marketed by Electromek of Carlstadt, N.J. gave highly satisfactory results. Use of this adhesive enabled the laminate to achieve better than 3 pounds peel strength, the minimum usually designated for plastic furniture covering applications.

Another adhesive that has been found to provide good adhesion comprises the use of 450 parts by weight of ethylene-vinyl acetate emulsion such as "Elvacite 1875" produced by Reichold Chemical Company, and a surfactant such as Aerosol OT-75 marketed by American Cyanamide. This is present up to 2 parts by weight; preferably 1 part is used. The third ingredient is Toluol present in 30–75 parts by weight, the preferred amount being 50 parts by weight. The surfactant and the Toluol are added to the emulsion with slow stirring until thickening occurs.

At the same time, the knitted fabric 11 on reel 21 is passed around idler 23 and a slat expander 25 until it makes contact with the now coated web 13. The composite laminate material 36 then is passed over additional idlers 37 and 38 and then over slot expanders 40 and 42 in sequence. From the latter, it is wrapped around idler 44 and then around a first Teflon-coated, 24" diameter steel drying (heated) drum 46. The composite 36 is wrapped around the first heating drum 46 with low tension and contacts approximately 270° of its surface.

The composite 36 then passes over an idler 48 and a second rubber idler roll 50. Thence, it is again wrapped at low tension around a second drying (heated) Teflon-coated, 24 inch diameter drum 52. Both 24" Teflon drums are heated to 210°–215° F.

From the second drum, the composite 36 is passed around an idler 54 and then around an 8-inch Teflon-coated roll 56. The latter is maintained at a temperature of 150° F. and the laminate 36 passes over it with a speed of 9 yards per minute.

From the roller 56, the laminate 36 passes lightly between rollers 58 and 60 and then around idler 62 to the first cooling drum 64 which is driven. This drum 64 is supplied with water at about 50° F. and so is the next drum 66 so as to cool down the laminate 36 to ambient temperature.

FABRIC CONSTRUCTION—FIGS. 2 AND 3

As started previously, this invention has for its object the preparation of a leather-like laminated vinyl fabric especially intended for covering furniture. The inventors have been able to obtain an ultra-soft laminated vinyl plastic which has a leather-like hand and drape and has controlled multi-directional stretch to accommodate the needs of upholstery manufacturers. It also has to have a minimal peel strength to stand up to the heavy usage to which upholstery covering is usually put.

Figure 3:
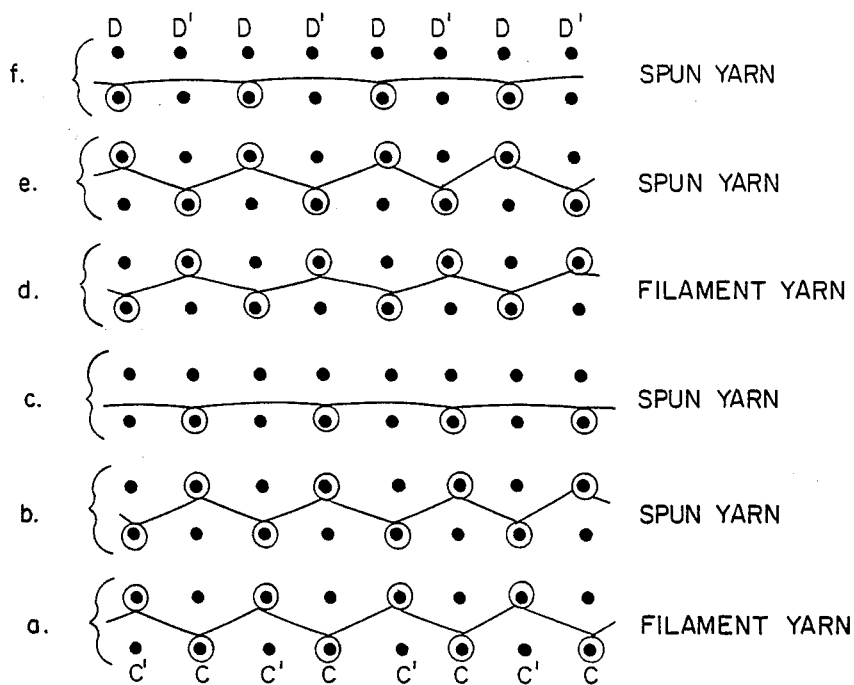
FIG. 3 is a schematic diagram showing the stitches of the fabric shown in FIG. 2 relative to the needles of a cylindrical knitting machine.

In order to produce the kind of laminated vinyl fabric as portrayed in FIG. 1, which has the desired characteristics and in which the fabric backing matches or complements the characteristics of the vinyl, considerable thought and experimentation gave rise to the fabric shown in FIGS. 2 and 3. The fabric had to be suitable for production, not be too heavy relative to the thickness of the unsupported vinyl and have the desired stretch characteristics. The objectives included the minimal contact of the backing to the vinyl consistent with a predetermined minimal peel strength and also with the desired compliance, softness, hand and drape of the composite laminated fabric. It was also desired that the surface of the vinyl be smooth or at least have the desired texturizing, but not show the imprint of the backing fabric. This would render the appearance of the composite fabric displeasing and tend to make the composite "boardy" or stiff instead of supple.

In order to achieve the suppleness and the desired hand, it was found that as few stitches as possible of the backing should be bonded to the vinyl by the intermediate adhesive. Furthermore, at the points of bonding, it was desired that the contact stitches or portions thereof penetrate only minimally into the inner surface of the vinyl so that the yarns of the backing fabric would have more mobility and the vinyl could be more resilient, compliant or supple to achieve the desired hand.

FIG. 2 is a view of a highly satisfactory backing fabric which was laminated onto the under surface of unsupported vinyl by means of the adhesive(s) mentioned above in connection with the description of the laminating process. The fabric is knitted in a mock double-knit construction. It is not a finished fabric and was designed, in part, for controlled stretching in both the lengthwise and widthwise directions.

As shown in FIG. 2, the fabric is of an interlock double-knit construction. FIG. 2 shows the various knitted stitches and their travel in the fabric. As shown, the surface appearing closest to the reader is the one which is bonded to the back of the vinyl itself. It is so made that it will have the ability to become strongly hamated to the adhesive layer 12 shown in FIG. 1. This surface, as shown in FIGS. 2 and 3, has a recurrent cycle of six feeds producing six courses a through f. Of these courses, courses c and f are minimally made of a spun yarn. Such spun yarns can be made of, for example, pure polyester or blends of polyester and cotton such as 75% polyester to 25% cotton, 65% polyester to 35% cotton, 50% polyester to 50% cotton. One such yarn that has been found highly satisfactory for this purpose is a 30/1 Tillinghast-Stiles 50%—50% blend, polyester-cotton carded natural knitting, waxed, twist-on cones yarn. It is seen that in courses c and f, there is a stitch on every other needle. In course c, the stitch is on every even cylinder needle C; in course f, the loop or stitch is on every odd cylinder needle C'. In both courses, however, there is no stitch on the intervening dial needles. Also, the long loops in course c, which extend upward two courses above the course being knitted, are displaced laterally one wale from the corresponding loop of course f. The construction of courses c and f is such as to control stretch in the width direction of the backing fabric.

If desired, courses other than courses c and f may be knitted of spun yarns identical to or similar to spun yarns previously mentioned in connection with courses c and f. In the particular example shown, courses b and e were also formed of the same yarn although, as shown in the needle diagram of FIG. 3, and in the loop diagram of FIG. 2, the stitches are made differently. The stitches of those two courses, as shown in the needle diagram of FIG. 3, are complementary to one another. That is, whereas stitches are formed in b on odd ones of the cylinder needles C' in course b and on even dial needles D' in that same course; the opposite is true in course e. Each of the loops on courses b and e extend upwardly for two courses, but the alternate loops of each of those courses are mostly not in contact with the adhesive. This minimal contact helps to produce the suppleness of the hand of the composite fabric.

Courses a and d are not made of spun yarns; rather, they are made of polyester filament yarns such as the Sher-Mishkin single 100-34, natural 4736/12 yarns. The construction of the stitches on the dial and cylinder needles in course a is complementary to that of the stitches on course d. The loops on the dial needles D as shown in FIG. 2 extend upwardly for four courses, but are largely out of contact with the adhesive directly. The loops on the even cylinder needles C extend upward only two courses, but are largely in contact with the adhesively-coated surface of the vinyl. In course d, the loops are offset from the loops in course a and the same construction is found.

The fabric may be made on various types of machines such as the 30" diameter interlock knitting cylindrical machines or on double-knit machines in which, in order to provide the type of construction at courses c and f, on the third and sixth feeds of the machine's periphery, the welting or non-use of needles can occur either in the cylinder or in the dial. The polyester filament yarns impart the necessary strength to the backing fabric. The example just explained attains the desirable minimal contact of the yarns to the adhesive achieved in large part by the use of yarns that are chosen to adhere most firmly without impairing the hand yet providing the necessary strength and stretch in both directions.

What is claimed is:

1. A process for making a laminated vinyl fabric comprising:
    (a) preparing a mixture comprising substantially equal proportions of at least one vinyl resin and of at least one plasticizer therefor;
    (b) extruding said prepared mixture into the form of a web having a thickness sufficient to be self-supporting;
    (c) promptly embossing a first surface of said newly-extruded web while said web is still hot from said extrusion;
    (d) applying an aqueous adhesive to a second surface of said web; and
    (e) laminating said second surface of the embossed web to one surface of a double knit backing fabric at a maximum temperature of about 220° F., said fabric having a structure such that only superficial portions of said one surface of said backing fabric contact said adhesive, said adhesive portion substantially not penetrating into said second surface of said web.

2. A process for making a textured, laminated, synthetic fabric having a pleasing hand, comprising:
    (a) preparing a mixture having major proportions of at least one vinyl resin and at least one plasticizer;
    (b) extruding said prepared mixture into the form of a web having a thickness sufficient to be self-supporting and so as to totally avoid the need for a supporting carrier strip;
    (c) promptly embossing a first surface of the newly-extruded web while said web is still hot from extrusion;
    (d) applying an adhesive to a second surface of said newly-extruded web; and
    (e) laminating said second surface of the embossed web to one surface of a knitted backing fabric at a maximum temperature of about 220° F.

3. The method of claim 2 wherein the knitted backing fabric has a predetermined pattern and the thickness of the extruded web is sufficient to prevent the backing fabric pattern to be visible on the surface of the web opposite the surface laminated to the adhesive.

4. The process according to claim 1 wherein said plasticizer and resin are each present in the range of about 40–42% by weight in said mixture.

5. The process according to claim 1 wherein said plasticizer comprises a mixture of different plasticizers.

6. The process according to claim 5 wherein said mixture of plasticizers comprises monomeric and polymeric plasticizers.

7. The process according to claim 1 wherein said resin is comprised of high and low molecular weight resins.

8. The process according to claim 7 wherein up to about 75 parts by weight of said mixture are fillers.

9. The process according to claim 8 wherein up to about 10 parts by weight of said mixture comprises pigments and/or lubricants.

10. The process according to claim 1 wherein said knitted fabric is of an interlocked double-knit construction.

11. The process according to claim 10 wherein said knitted fabric comprises spun yarns made of polyester and cotton in the ratio of 100%–0% polyester to 0–50% cotton.

12. The process according to claim 10 wherein said double-knit fabric comprises spun yarns and filament yarns and selected ones of said spun yarns are positioned to adhere to the surface of said web opposite said embossed surface.

13. The process according to claim 2 with the addition of a top-coating step after said embossing step for imparting desired surface characteristics to said embossed first surface of the web.

14. The process according to claim 2 with the addition of a top-coating step after said laminating step for imparting desired surface characteristics to said embossed first surface of the web.

15. The process according to claim 1 wherein said adhesive is an aqueous adhesive.

16. The process according to claim 15 wherein said aqueous adhesive is an emulsion.

17. The process according to claim 1 wherein said resin is a polyvinyl chloride resin and wherein said maximum temperature is in the range of about 200° F.–220° F.

18. The process according to claim 1 wherein, during lamination, conveying of said web is done at wrap tension.

19. The process according to claim 1 wherein said resin is polyvinylchloride and wherein said resin and said plasticizer are present in substantially the same percentages by weight in said mixture.

20. The process according to claim 1 wherein said backing fabric is disposed relative to the second surface of said web such that only selected portions of said knitted fabric adhere to said second surface of said web where said adhesive is disposed.

* * * * *